UNITED STATES PATENT OFFICE.

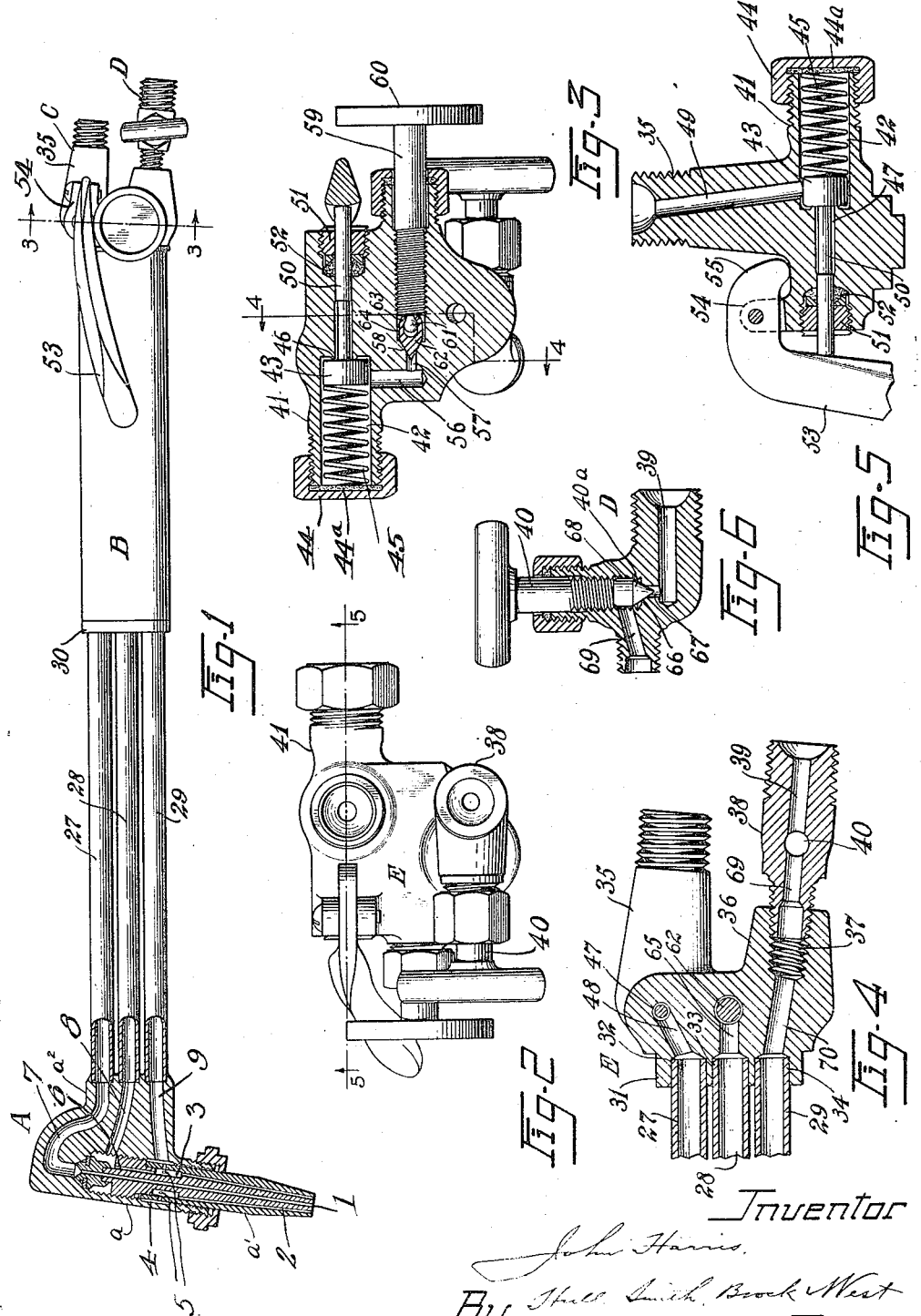

JOHN HARRIS, OF CLEVELAND, OHIO, ASSIGNOR TO CARBO-HYDROGEN COMPANY OF AMERICA, OF PITTSBURGH, PENNSYLVANIA, A CORPORATION OF DELAWARE.

VALVE MECHANISM FOR BLOWPIPES AND THE LIKE BURNERS.

1,277,069.   Specification of Letters Patent.   Patented Aug. 27, 1918.

Original application filed December 17, 1914, Serial No. 877,649. Divided and this application filed January 2, 1917. Serial No. 140,111.

*To all whom it may concern:*

Be it known that I, JOHN HARRIS, a citizen of the United States, residing at Cleveland, in the county of Cuyahoga and State of Ohio, have invented a certain new and useful Improvement in Valve Mechanism for Blowpipes and the like Burners, of which the following is a full, clear, and exact description, reference being had to the accompanying drawings.

This invention relates to blow pipes or torches such as are employed for the purpose of cutting metal with oxygen. In the operation of such torches, the metal is preheated by means of a mixture of oxygen and a combustible gas, preferably directed from a head having passageways therein connecting with a chamber containing such mixture, the oxygen for cutting the metal thus preheated being also supplied from the head through a passageway delivering the oxygen in proper relation to the preheating jets issuing from the first mentioned passageways. The oxygen and combustible gas are conducted through this head by means of pipes and, in the embodiment of my invention herein set forth, special valve mechanism is provided for controlling the flow of oxygen and combustible gases through the aforesaid pipes.

It is a general object of my invention to provide a blow pipe or torch of the general character described with an extremely efficient and convenient arrangement of valve mechanism whereby the efficiency of such blow pipes will be enhanced. Further and more limited objects of my invention will appear in the specification and will be embodied in the combinations of elements included in the claims hereto annexed.

In the drawings forming a part hereof, Figure 1 represents a side elevation of the torch or blowpipe having my valve mechanism applied thereto, the head of the torch being shown in section; Fig. 2 a rear elevation of the body including the valve assembly; Fig. 3 is a sectional detail corresponding to the line 3—3 of Fig. 1, the stems of the oxygen controlling valves being shown in elevation; Fig. 4, a sectional detail corresponding to line 4—4 of Fig. 3; Fig. 5 a sectional detail corresponding to line 5—5 of Fig. 2, the valve and stem being shown in elevation; and Fig. 6 a vertical sectional view of the valved connection for combustible gas, the valve proper being shown in elevation.

Describing by reference characters the various parts illustrated herein, A represents generally the head of the torch or blowpipe; B a tubular handle for operating the same; C the connection through which the oxygen is supplied to the head for preheating and cutting purposes, and D the connection for the combustible gas.

The burner head comprises a body $a$ having connected thereto a detachable tip $a'$ and having a lateral extension $a^2$ which is preferably cast with the head proper and provided with a plurality of passageways arranged to supply oxygen for the cutting jet and for the preheating mixture as well as the combustible gas or gases mingled with the oxygen for the production of the preheating flame. For convenience of description, the blow pipe or torch will be considered as operated in the position shown in Fig. 1 and the terms "top" and "bottom" will be employed accordingly.

The body $a$ supports a two-piece tip, the body and tip comprising a burner having a passageway 1 for cutting oxygen and passageways 2 adapted to receive a mixture of oxygen and a combustible gas for heating purposes from a chamber 3, said chamber communicating with an annular chamber 4 in said head by means of ports 5 in the outer portion of the tip as well as with a passageway 6 extending through a head on the inner portion of the tip. The head is provided with three passageways, 7, 8 and 9, communicating respectively with the central passageway 1, the passageway 6, and the chamber 4.

27, 28 and 29 denote three tubes which are connected to the lateral extension $a^2$ of the head A and which communicate respectively with the passageways 7, 8 and 9. These tubes at their rear end (the ends remote from the head A) are connected to the valve body E which contains a chamber, passageways, and a coöperating valve constructed for controlling the flow of oxygen and combustible gas to the blowpipe head. The tubular handle B is sleeved at its rear end upon the body E and at its front end upon a suitable support 30 which is provided with apertures for the tubes 27, 28 and 29.

The detailed construction of the blowpipe head forms the subject matter of my application No. 71,626, filed Jan. 12, 1916, and this application is a division of my application No. 877,649 filed December 17, 1914 (Patent No. 1,217,119 issued February 20, 1917).

The body E is a casting containing passageways for supplying oxygen to the tubes 27, and 28 and a passageway for supplying combustible fluid to the tube 29. In its front end it is provided with a rib 31 having tapered recesses 32, 33 and 34 whereinto the rear ends of the tubes 27, 28 and 29 are swaged, after which they may be permanently connected as by solder or in any approved manner. At its rear end, the valve body E is provided with a connection 35, preferably cast integral therewith and constituting an extension thereof and which connection is adapted to have coupled thereto the flexible tube through which oxygen is conducted to the tube 27.

Also cast with the body E is an extension 36 having an internally threaded bore 37 for the reception of a connection 38 to which a pipe or flexible tube for combustible gas may be secured. The connection 38 is provided with a passageway 39 therethrough, said passageway being controlled by a valve 40.

Also preferably cast integral with the body E is an extension 41, said extension having a large bore 42 therewithin providing a chamber for the reception of a valve 43. The extension 41 is threaded at its outer end for the reception of a cap 44, the chamber 42 receiving therewithin a spring 45 adapted to bear at one end against a packing 44ª within the cap and its other end against the valve, thereby retaining the valve in contact with the annular seat 46 surrounding the inlet end of the passageway 47 extending from the chamber 42. From the passage 47 the passageway 48 extends to the pipe 27.

The extension 35 is provided with a passageway 49 leading to the chamber 42.

For the purpose of operating the valve 43 to permit the flow of oxygen from the passageway 49 to the pipe 27 and thence to the appropriate passageway in the blowpipe head, I mount an operating stem 50 within the passageway 47, extending said stem through the body E and providing a leak-proof joint by means of a plug 51 through which the outer end of the stem 50 projects, the plug being threaded into the body and serving to compress packing material 52 about the stem. For the purpose of operating the stem, a lever 53 is pivoted to the body E between a pair of lugs 54, the end of the lever being preferably curved, as indicated at 55, whereby it will substantially abut against the body E when the valve 43 is seated by the spring 45.

The body E is also provided with a passageway 56 extending laterally from the chamber 42 and communicating with a passageway 57 having a valve seat 58 controlled by a valve of the needle type. This valve will be preferably a valve such as shown in my application No. 877,649 filed Dec. 17, 1914 and shown, described and claimed in my application No. 14,536 filed March 15, 1915; this valve comprises generally a stem 59 which is threaded into the body E and is provided with an operating wheel 60. At its inner end the stem is provided with a rounded head 61 on which the valve tip 62 is mounted, the valve tip having a needle point coöperating with the seat 58 and having a recess to receive the rounded head 61, the metal at the outer end of the tip being bent inwardly about the head 61, as shown at 63. The valve tip 62 extends across a chamber 64, and a passageway 65 leads from this chamber to the pipe 28. The valve 40 is preferably of the same construction as the valve just described and its tip coöperates with a seat 66 at the discharge end of the passageway 67, which in turn communicates with the passageway 39. From the chamber 68 which surrounds the valve tip 40ª, a passageway 69 extends to and forms a continuation of the passageway 70 within the extension 36, the passageway 69 conducting combustible gas to the pipe 29.

In the operation of the blowpipe, combustible gas will be conducted through the apertures 5 into the chamber 3 by merely opening the valve 40. The valve 59 will then be opened, admitting a supply of oxygen through the pipe 28 to the chamber 3 by means of the passageway 49, chamber 42, passageways 56, 57, chamber 64 and passageway 65. The metal having been preheated to the desired extent, the operator, holding the torch by the handle B, closes his hand against the lever 53 thereby unseating the valve 43 and allowing oxygen from the chamber 42 to flow through the passageways 47 and 48 into the tube 27 and thence through the central passageway of the blowpipe head.

The construction of the valve mechanism described and claimed herein is in some respects identical with the construction shown in my application No. 877,649, filed Dec. 17, 1914, and in my application No. 71,626, filed January 12, 1916.

Having thus described my invention, what I claim is:—

1. In a blowpipe, the combination, with a head having passageways for supplying oxygen and a mixture thereof with a combustible gas, respectively, to jets, of a valve body having therein a valve-controlled passageway for combustible gas and an inlet passageway for oxygen, a chamber communicating with the second passageway, an annular valve seat in said chamber, a valve in said chamber, a spring in said chamber normally holding said valve against said seat, a passageway for cutting oxygen extending through said seat and an operating stem therein, a passageway leading from the last-mentioned passageway to the oxygen passageway in said head, a valve-controlled passageway for heating oxygen extending from said chamber and conducting oxygen to the mixture passageway or passageways in said head, and means for operating said stem to unseat said valve.

2. As a means for supplying a combustible gas and oxygen to a blowpipe, a valve body having a through passageway for combustible gas and an inlet passageway for oxygen, a chamber whereinto said inlet passageway discharges, a valve seat at one end of said chamber, a valve in said chamber, a spring normally holding said valve upon said seat, a passageway for heating oxygen extending from said chamber and a valve therefor, a second passageway for cutting oxygen extending from said chamber and through the valve seat and having a stem therein, a passageway leading from the last-mentioned passageway, and means carried by said body and extending across the outer end of said stem whereby the valve in the chamber may be unseated.

3. As a means for supplying a combustible gas and oxygen to a blowpipe, a valve body having a through passageway for combustible gas, a valved connection adapted to communicate with said passageway, said body also having an inlet passageway therein for oxygen, a chamber whereinto said inlet passageway discharges, an annular valve seat at one end of said chamber, a valve in said chamber coöperating with said seat, a spring normally holding said valve upon said seat, a passageway for heating oxygen extending from said chamber and a valve therefor, a passageway for cutting oxygen extending from said chamber through the valve seat and having a valve-operating stem therein, a passageway leading from the last mentioned passageway, and a lever carried by said body and operatively engaging said stem to unseat the valve in said chamber.

4. As a means for supplying oxygen to the head of a cutting blowpipe or torch, a valve body having a chamber therein and means for supplying oxygen thereto, said chamber having at one end thereof an annular valve seat and a passageway for cutting oxygen extending through and away from said seat and a passageway for heating oxygen extending from said chamber, a valve in said chamber coöperating with said seat, means normally holding said valve on said seat, a valve-operating stem in the first mentioned passageway, and a passageway extending from the second passageway for the purpose of conducting heating oxygen to the blowpipe head, said body having a valve controlling the second passageway.

5. As a means for supplying oxygen for preheating and cutting purposes to a blowpipe head, a valve body having a chamber therein, said chamber having at one end thereof a seat, a valve in said chamber coöperating with said seat, means in said chamber normally holding said valve upon said seat, said body having an inlet passageway communicating with said chamber, a valve-controlled passageway for heating oxygen leading from said chamber, a passageway for cutting oxygen extending through and away from said seat, a passageway communicating with the last mentioned passageway for conducting cutting oxygen to such head, a valve-operating stem in the passageway which extends through the seat, and means carried by said body for operating said stem.

In testimony whereof, I hereunto affix my signature.

JOHN HARRIS.